(No Model.) 3 Sheets—Sheet 1.
C. H. MATTICE.
BALANCE.
No. 600,979. Patented Mar. 22, 1898.
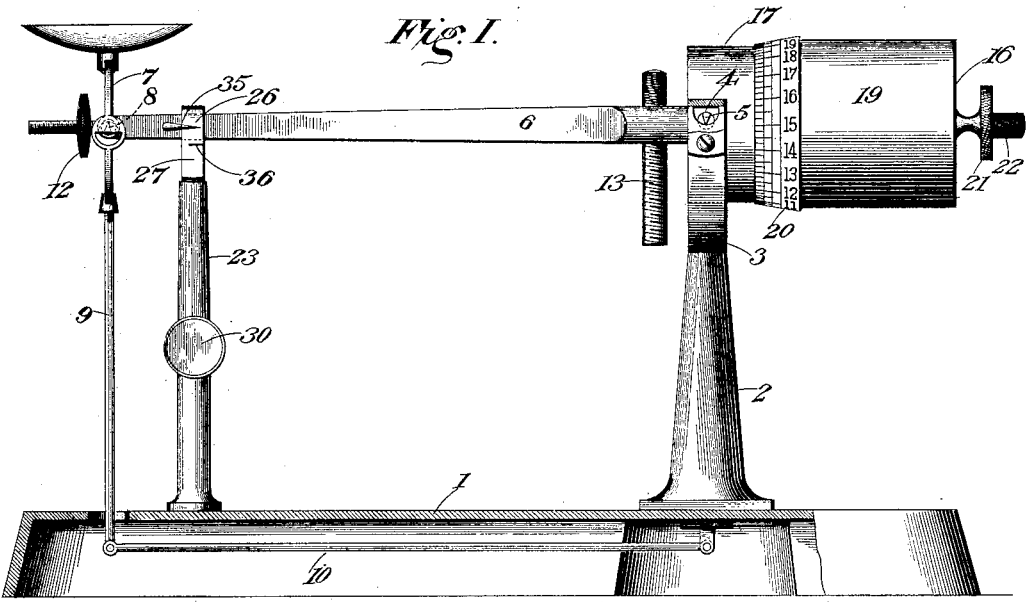
Fig. I.
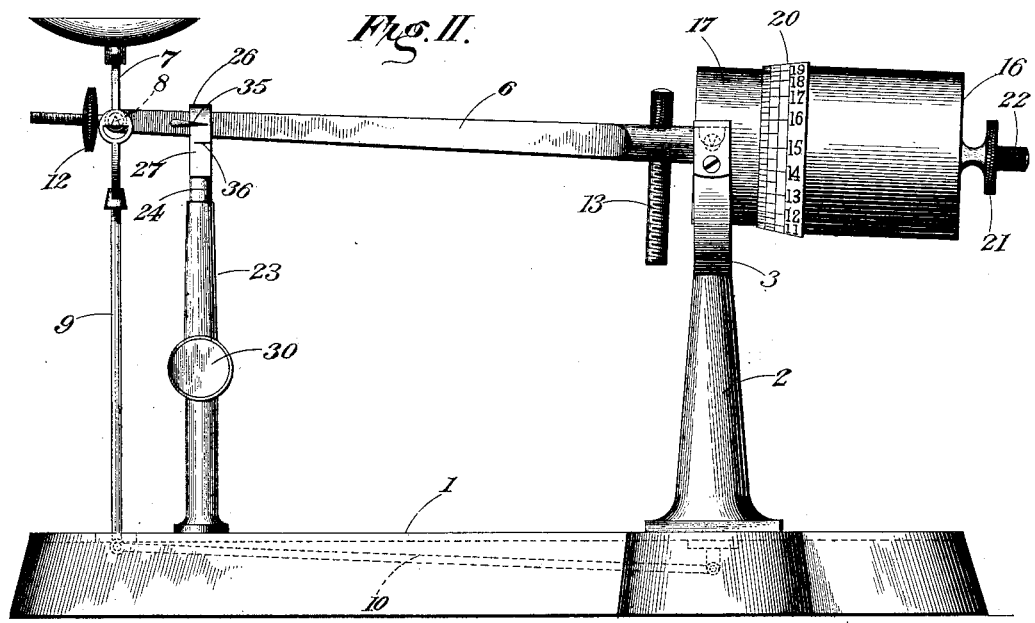
Fig. II.
WITNESSES
M. E. Fowler
S. Wacker
INVENTOR
Charles H. Mattice
By Joseph L. Atkins
Atty.

(No Model.) 3 Sheets—Sheet 2.
C. H. MATTICE.
BALANCE.
No. 600,979. Patented Mar. 22, 1898.
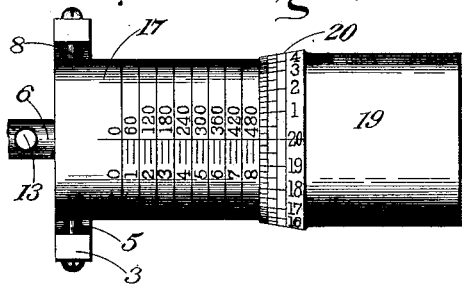
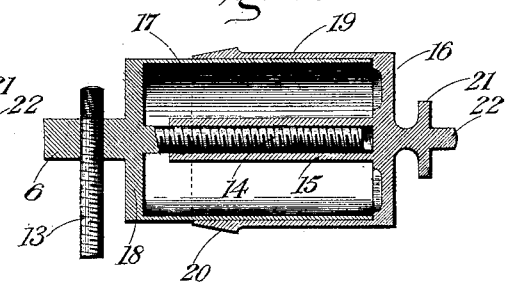
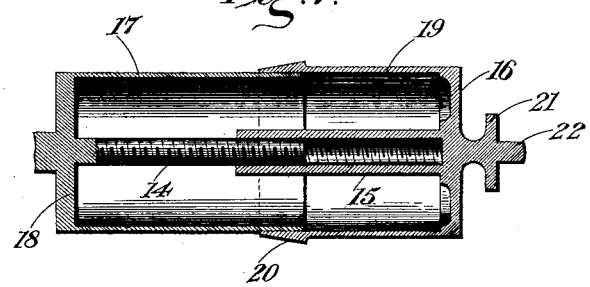
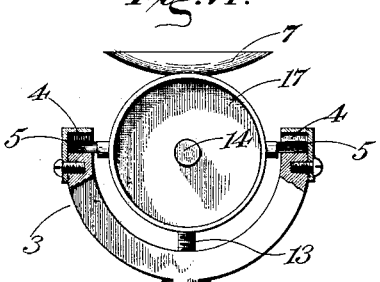
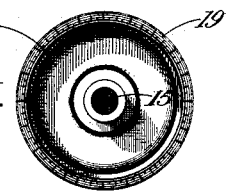
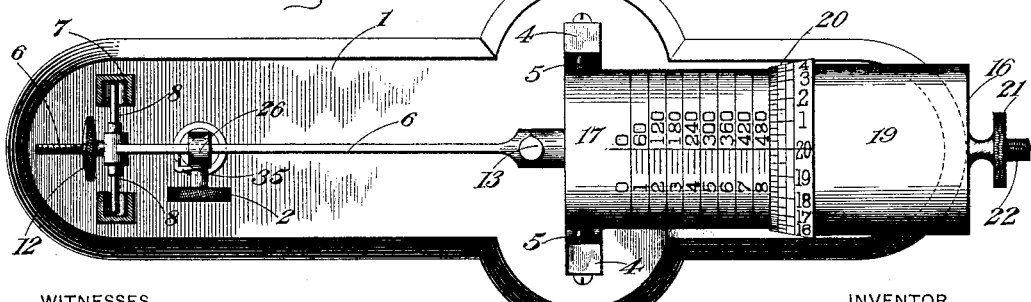
WITNESSES
M. E. Fowler
INVENTOR
Charles H. Mattice (No Model.)   3 Sheets—Sheet 3.
C. H. MATTICE.
BALANCE.
No. 600,979. Patented Mar. 22, 1898.
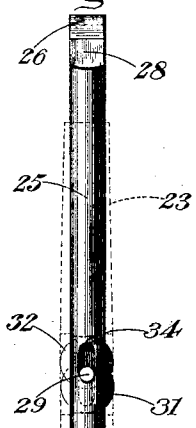
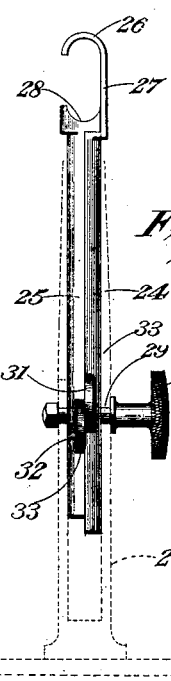
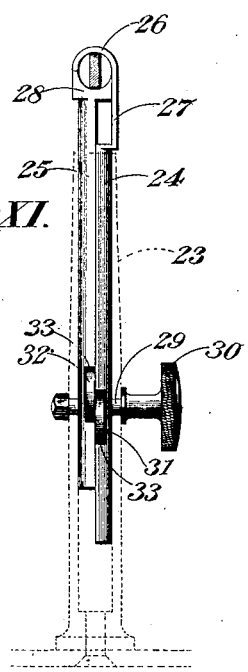
WITNESSES
M. E. Fowler
S. N. Acker
INVENTOR
Charles H. Mattice
By Joseph L. Atkins
Atty.

UNITED STATES PATENT OFFICE.

CHARLES H. MATTICE, OF TROY, NEW YORK, ASSIGNOR TO THE MICROMETER BALANCE SCALE COMPANY, OF SAME PLACE.

BALANCE.

SPECIFICATION forming part of Letters Patent No. 600,979, dated March 22, 1898.

Application filed June 24, 1896. Serial No. 596,717. (No model.)

*To all whom it may concern:*

Be it known that I, CHARLES H. MATTICE, of Troy, county of Rensselaer, State of New York, have invented certain new and useful Improvements in Scales or Balances, of which the following is a specification, reference being had to the accompanying drawings.

One object of my invention is to produce improvements in scales whereby delicately-accurate measurements of the weights of ponderable bodies may be ascertained throughout ranges of minute gradations without the employment of the ordinary loose or shifting weight measures.

Another object is to produce a magnified scale-indicator of the movement of the weight or weight measure to and from the fulcrum of a scale-beam.

Another object of my invention is to produce a delicate beam-clamping mechanism by which the beam may be secured in the horizontal position to steady it and afterward released without shock or jar of any kind to disturb its equilibrium when the weight is properly adjusted upon it.

In the accompanying drawings, Figure 1 is a side elevation of one form of my scale complete, showing it in the stationary position and the weight adjusted to zero. Fig. 2 is a similar view showing the clamping mechanism released. Fig. 3 is a view of the weight portion of the scale with the weight retired to its farthest point from the fulcrum. Fig. 4 is a transverse vertical section through the weight end of the beam and the weight, showing the weight at zero. Fig. 5 is a similar view showing the weight as in the position shown in Fig. 3. Fig. 6 is an end view of the scale, looking toward the weight end of the beam, with the weight detached. Fig. 7 is an interior end view of the weight detached. Fig. 8 is a top plan view of the scale with the weight in the position shown in Fig. 3. Fig. 9 is a side elevation of the clamping mechanism with the sheath removed. Fig. 10 is a view, taken at right angles, showing the clamping mechanism open; and Fig. 11 is a similar view showing the clamping mechanism closed.

In the drawings I have illustrated one and that the simplest form of embodiment of my invention. It is to be understood that I contemplate in practice the employment of any of the well-known accessories to weighing-scales of the different varieties not in public use and that I do not limit the application of my invention to any special variety or class of weighing-scales. With this provision I shall proceed to the description of the drawings, reference being had to the figures thereon.

1 indicates the base of the standard-scale, illustrated for example, and 2 the upright beam support or standard thereon. These parts being merely illustrative of mechanism for supporting a beam do not require special description.

The standard, as illustrated, is preferably a bifurcated head 3, the arms of which are provided with bearing recesses or boxes 4, within which, as by means of trunnions 5, the beam 6 is pivotally supported or fulcrumed, the connections between the boxes and the trunnions constituting the fulcra.

The usual means for rendering the beam delicately vibratory—such, for example, as knife-edges upon the trunnions—may be employed.

Upon one extremity the beam carries a pan, platform, or other support 7, carried, for example, as illustrated, upon studs 8 and in the form shown, held upright by a vertical rod 9, pivotally connected to a horizontal rod 10, that is also pivoted at the bottom of the base, as, for example, underneath the upright 2, thus securing parallel movement between the beam 6 and the rod 10.

The end of the beam may be screw-threaded to carry an adjustment-nut 12 and may be provided near its fulcrum with a vertically-adjustable plug or screw 13 for raising and lowering the center of gravity in order to secure most delicate adjustments.

14 indicates a rigid coaxial prolongation or extension of the beam 6, constituting, in fact, that end of the beam which extends beyond the opposite side of the fulcrum from that side on which the beam, numbered 6 in the drawings, extends. It is, in fact, the scale end of the beam or that end which carries the scale measure. It is cylindrical in shape and is screw-threaded to fit the internally-screw-threaded bore of the tube 15, that is secured to and forms a part of the weight 16.

By turning the weight the tube 15, working on the screw-threads of the part 14, may be made to travel with regularity and precision of movement to or from the fulcrum of the beam, the change of leverage thus obtained sufficing, in accordance with well-known laws, to render the single weight 16 available to measure accurately within prescribed limits the weight of any object which may be placed in the pan 7.

The pitch of the correlative screw-threads upon the projection 14 and within the bore of the tube 15 determines the degree of the axial movement or movement in the direction of the longitudinal axis of the beam which the weight 16 makes with each complete revolution. Therefore the pitch of the threads may be changed at will to suit the character of the scale upon which they are intended to be employed and the kind of work which the scale is intended to do. Not only is a certain axial movement imparted to the weight in each complete revolution, but each complete revolution is susceptible of subdivision, and each degree of subdivision, however minute, will indicate a proportionate axial movement of the weight, each degree of the axial movement of the weight in scales of sufficiently-delicate adjustment being sufficient to disturb a previously-established equilibrium in the beam. By this means the most delicate differences or variations between bodies to be weighed in the pan 7 may be accurately ascertained. It may be apprehended, however, that in scales of minute graduations the number of screw-threads to the inch (it being practicable to make them one hundred or more to the inch) would be so great as to render the axial movement of each complete revolution of the beam practically illegible and the reading of the axial movement produced by a partially-complete revolution thereof impossible. On that account I provide a magnified scale-indicator which affords means for readily reading the most minute axial movement of the weight produced by a complete revolution thereof or by any portion of a complete revolution thereof. I accomplish this by projecting in effect the lines of the screw-threads upon a scale-exhibitor of greater diameter than the screw 14, the increase of diameter being practically determinable by the pitch of the threads of the screw and the consequent degree of magnification required.

As complementary to the scale-exhibitor on the beam I prefer to provide both an indicator and a scale-exhibitor upon the weight. In its indicative capacity the indicator upon the weight will readily declare the axial movement of the weight obtained through a complete revolution thereof with reference to the scale-exhibitor upon the beam, and in its capacity as an additional scale-exhibitor it indicates the axial movement produced through any portion of a complete revolution of the weight upon its screw.

In the form of embodiment illustrated in the drawings the scale-exhibitor upon the beam or the "beam scale-exhibitor," as it may be called, consists of a cylinder 17, coaxially secured to and made part of the beam 6, as by a disk-head 18. As illustrated, the cylinder 17 surrounds the screw 14, with which, as stated, it is coaxial. The disk 18 is in line with the fulcrum of the beam, and its weight is therefore not of consequence. If, however, the weight of the cylinder 17 were considerable, it would necessitate an increased length of beam, which would be objectionable in small scales. For that purpose I prefer to employ a hollow cylinder, which enables it to perform its function of scale-exhibitor without material increase of weight upon the end of the beam to which it belongs. This is particularly true if it be made of light material—for example, of aluminium.

The scale-exhibitor upon the weight consists of a cylinder 19, coaxial with the cylinder 17 and of an internal diameter to neatly fit upon the exterior of the cylinder 17, so that when the weight is turned upon the screw 14 the cylinder 19 slips smoothly without friction upon the surface of the cylinder 17, both parts being for that purpose preferably highly polished. The edge of the cylinder 19 is preferably slightly beveled, as indicated at 20, and presents an inclined surface toward the cylinder 17. The inclined boss 20 is graduated so as to indicate degrees of revolution of the cylinder 19, or, which is equivalent, of the weight 16, in terms of subdivision of the unit of weight to which the scale is adapted.

It is not material that the cylinder 19 should fit upon the outside of the cylinder 17. It is sufficient that either one telescope within the other; but if the cylinder 17 be the outside cylinder the scale measures illustrated in the drawings are interchanged, the circular scale appearing upon the cylinder 17 and the axial scale appearing upon the cylinder 19. It is obvious that in such modified form of my invention the cylinder 19 may be made solid, if preferred, and be itself provided with an internally-screw-threaded bore to fit the screw-threaded prolongation 14.

In the scale illustrated the unit of weight is the grain of the Troy system, four hundred and eighty grains being indicated on the cylinder 17, with marks on the cylinder to indicate subdivision into twentieths, twenty grains being indicated by each complete revolution of the weight 16 and its cylinder 19 and the subdivision of each complete revolution being subdivided into units of one grain each, as indicated by the numbered lines upon the boss 20. Further subdivision of each grain into fourths is indicated upon the boss 20 by short lines displayed between the numbered lines on the boss.

Upon the end of the weight 16 and coincident with its axis knurled disks or knobs 21 and 22, respectively, for imparting rotation to the weight are provided. The knobs 21 and 22 may be called the "rotative members" of the weight. The smaller pin will, through a twist given to it by the thumb and finger of an operator, impart several rotations to the weight, while the larger knob will impart only one rotation or a part of a rotation. This affords simple and convenient means for shifting the weight from place to place, as required.

The next feature of my invention consists in clamping mechanism, which, in its preferred embodiment, consists of an upright sheath 23 upon the base 1. Within this sheath is confined vertically-movable rods 24 and 25, each preferably being a half-cylinder and conjointly neatly fitting within the sheath. One of the rods—as, for example, 24—carries a hook 26, which is supported by a slightly-elongated shank 27. The other rod carries a crotch or fork 28, which fits into the offset afforded by the position of the shank and is adapted to move vertically in a path directly opposite the hook 26.

The hook and the crotch constitute clamping-jaws, in addition to which I employ jaw-actuating mechanism for simultaneously actuating the jaws in opposite directions. Such actuating mechanism preferably consists of a shaft 29, rotatably secured in the walls of the sheath and provided with a knurled head 30 for rotating it. The shaft carries oppositely-disposed cams 31 and 32, that are fixed to it. These cams move in recesses 33 in the rods 24 and 25, respectively, and by the rotation of the shaft impart the required motion to the jaws, the vertical movement of the rods 24 and 25 being permitted by longitudinal kerfs 34 in them through which the shaft 29 passes.

The beam 6 may be provided with an angular pointer 35, which moves vertically across the shank 27 of the hook 26, the shank being provided with a line 36 on its outside to indicate when the beam is in equilibrium.

In operation the body to be weighed is placed upon the pan or support 7 and the weight 16 is adjusted in the manner described until the pointer 35 indicates upon the line 36 that the beam is in equilibrium. The weight may then be read by comparison of the scale measures upon the cylinder 17 and boss 20, respectively. In operating the weight 16 or in bringing the beam to rest after the adjustment has been made the clamping mechanism may be employed to hold the beam 6. Thereafter, by the operation of the shaft-head 30, the jaws are simultaneously separated from the beam 6 and it is released without imparting any vibration to it.

What I claim is—

1. The combination with a scale-beam and support, of a weight, screw-threaded thereto, and coaxially movable thereon in the manner described, and telescoping cylinders inscribed, respectively with correlative scale measures, carried upon the beam and the weight, respectively, substantially as set forth.

2. The combination with a scale-beam and its support, of a screw-threaded prolongation of the beam, and a coaxial hollow cylinder carried thereon around the screw-threaded prolongation, a weight and internally-screw-threaded tube adapted to fit the prolongation of the beam, a coaxial cylinder surrounding the same, the tube and cylinder being inscribed with correlative scale measures, and the cylinder upon the beam and the cylinder upon the weight being adapted to telescope one upon the other, substantially as set forth.

3. The combination with a vibratory scale-beam, and its support, of a sheath, semicylindrical rods carried therein, beam-clamping jaws located upon the respective rods, and mechanism for simultaneously actuating the rods in opposite directions, substantially as set forth.

4. The combination with a scale-beam and its support, of beam-clamping jaws and rods, a sheath containing the rods, a shaft mounted in the walls of the sheath, oppositely-disposed cams secured to the shaft, the rods being provided with recesses in which the respective cams work, and with longitudinal kerfs through which the shaft passes, substantially as and for the purpose specified.

In testimony of all which I have hereunto subscribed my name.

CHARLES H. MATTICE.

Witnesses:
 H. T. HARP,
 P. F. MILLER.